(12) United States Patent
Miyasaka (10) Patent No.: US 10,258,909 B2
(45) Date of Patent: Apr. 16, 2019

(54) WORK VEHICLE

(71) Applicant: KOMATSU LTD., Tokyo (JP)

(72) Inventor: Hisashi Miyasaka, Komatsu (JP)

(73) Assignees: KOMATSU LTD., Tokyo (JP); YAMASHIN-FILTER CORP., Yokohama (JP)

( * ) Notice: Subject to any disclaimer, the term of this patent is extended or adjusted under 35 U.S.C. 154(b) by 1503 days.

(21) Appl. No.: 14/113,045

(22) PCT Filed: Feb. 27, 2013

(86) PCT No.: PCT/JP2013/055097
§ 371 (c)(1),
(2) Date: Oct. 21, 2013

(87) PCT Pub. No.: WO2014/132356
PCT Pub. Date: Sep. 4, 2014

(65) Prior Publication Data
US 2014/0238923 A1    Aug. 28, 2014

(51) Int. Cl.
*B01D 35/02* (2006.01)
*B01D 29/21* (2006.01)
(Continued)

(52) U.S. Cl.
CPC ............. *B01D 35/02* (2013.01); *B01D 29/21* (2013.01); *B01D 35/0276* (2013.01);
(Continued)

(58) Field of Classification Search
None
See application file for complete search history.

(56) References Cited

U.S. PATENT DOCUMENTS 6,540,909 B2 * 4/2003 Smith ................. B01D 29/114
 210/130
6,610,198 B1    8/2003 Jiang et al.
(Continued)

FOREIGN PATENT DOCUMENTS

CN    101283145 A    10/2008
JP    49-10112 U    1/1974
(Continued)

OTHER PUBLICATIONS

A supplementary European search report for the corresponding European patent application No. 13786610.9, dated Sep. 29, 2015.
(Continued)

*Primary Examiner* — Robert J Popovics
(74) *Attorney, Agent, or Firm* — Global IP Counselors, LLP (57) ABSTRACT

A work vehicle includes a work implement and an operating fluid tank. The operating fluid tank has a tank body and a strainer. The tank body is for collecting operating fluid for driving the work implement. The strainer is installed inside the tank body and includes a cylindrical filter and a cover member. The cylindrical filter is disposed with an axis extending in a vertical direction. The cover member includes an upper plate part and a cylindrical part. The upper plate part of the cover member covers an upper surface of the filter. The cylindrical part of the cover member extends downward from an outer edge part of the upper plate part and covers an upper side surface part of the filter with a gap between the side surface of the filter and the cylindrical part, while allowing a lower side surface part of the filter to be exposed.

12 Claims, 9 Drawing Sheets

(51) Int. Cl.
    *B01D 36/00*     (2006.01)
    *B01D 35/027*     (2006.01)
    *F15B 21/04*     (2019.01)
    *F15B 1/26*     (2006.01)
    *E02F 9/22*     (2006.01)
    *F15B 21/044*     (2019.01)

(52) U.S. Cl.
    CPC ............ *B01D 36/001* (2013.01); *E02F 9/226* (2013.01); *F15B 1/26* (2013.01); *F15B 21/044* (2013.01)

(56) References Cited

U.S. PATENT DOCUMENTS

| | | | | |
|---|---|---|---|---|
| 6,641,742 | B2* | 11/2003 | Prater | B01D 35/143 116/268 |
| 6,758,980 | B2* | 7/2004 | Prater | B01D 35/143 116/268 |
| 8,544,158 | B2* | 10/2013 | Curt | B01D 29/21 210/136 |
| 8,574,430 | B2* | 11/2013 | Chajec | B01D 29/21 210/85 |
| 2002/0125178 | A1 | 9/2002 | Smith et al. | |
| 2003/0102268 | A1* | 6/2003 | Prater | B01D 35/143 210/741 |
| 2009/0095441 | A1 | 4/2009 | Masunoya et al. | |
| 2009/0139915 | A1* | 6/2009 | Tondreau | B01D 29/114 210/86 |
| 2010/0108590 | A1* | 5/2010 | Curt | B01D 29/21 210/232 |
| 2010/0252494 | A1 | 10/2010 | Kitajima et al. | |
| 2011/0062061 | A1 | 3/2011 | Chajec | |
| 2011/0203099 | A1* | 8/2011 | Curt | B01D 29/21 29/428 |
| 2014/0238923 | A1* | 8/2014 | Miyasaka | B01D 35/02 210/241 |
| 2016/0214038 | A1* | 7/2016 | Morris | B01D 29/117 |

FOREIGN PATENT DOCUMENTS

| | | |
|---|---|---|
| JP | 2-53108 U | 4/1990 |
| JP | 2009-250081 A | 10/2009 |
| JP | 2010-101306 A | 5/2010 |
| JP | 2011-256956 A | 12/2011 |
| WO | 2007/072674 A1 | 6/2007 |

OTHER PUBLICATIONS

International Search Report for PCT/JP2013/055097, dated Jun. 11, 2013.
Office Action for the corresponding Chinese patent application No. 231380001463.3, dated Nov. 20, 2015.

\* cited by examiner

WORK VEHICLE

CROSS-REFERENCE TO RELATED APPLICATIONS

This application is a U.S. National stage application of International Application No. PCT/JP2013/055097, filed on Feb. 27, 2013.

BACKGROUND

Field of the Invention
The present invention relates to a work vehicle.
Background Information
A work vehicle such as a wheel loader and the like is equipped with an operating fluid tank for collecting operating fluid for driving a work implement such as a bucket or the like (see Japanese Patent Laid-open No. 2009-250081). A strainer is installed inside the operating fluid tank and hydraulic pumps suck the operating fluid out of the operating fluid tank through the strainer and supply the work implement, for example, with the operating fluid. As a result, operating fluid that is filtered by the strainer can be supplied to the work implement.

SUMMARY

However, due to swaying of the operating fluid tank in the front-back direction when the work vehicle performs work using the work implement, the oil level of the operating fluid rolls and becomes agitated so that air is mixed into the operating fluid. Cavitation occurs inside the hydraulic pumps when operating fluid including air bubbles is sucked through the strainer, and the cavitation leads to vibration and noise. The inventor of this application found that the oil level fluctuates up and down due to the forward and backward swaying of the operating fluid tank so that the top part of the strainer may project above the oil level and become exposed to the air layer existing above the oil level. A strainer in which the top part thereof is exposed to the air layer in this way sucks air and the abovementioned problem occurs in the same way.

The abovementioned problem is particularly noticeable when variable piston pumps are used for the hydraulic pumps. This feature is explained in more detail below. Firstly, when a variable piston pump is used as a hydraulic pump, the variable piston pump is necessarily immersed in the operating fluid even while the pump is not operating. In order to constantly immerse the hydraulic pump in the operating fluid, a construction is used in which the operating fluid tank is disposed above the hydraulic pump. As a result, the hydraulic pump is provided with the operating fluid from the operating fluid tank due to gravity so that the hydraulic pump is constantly immersed in the operating fluid even when the hydraulic pump is not operating. However, when the operating fluid tank is disposed above the hydraulic pump in this way, the abovementioned problem becomes even more noticeable since the operating fluid tank sways more easily when the work vehicle is performing work using the work himplement.

An object of the present invention is to suppress the suction of air (including air bubbles in the operating fluid) inside the strainer.

(1) A work vehicle according to an aspect of the present invention comprises work implement and an operating fluid tank. The operating fluid tank includes a tank body for collecting operating fluid for driving the work implement, and a strainer installed inside the tank body. The strainer includes a filter and a cover member. The filter has a cylindrical shape and the axis thereof extends in the vertical direction. The cover member includes an upper plate part that covers the upper surface of the filter, and a cylindrical part that extends downward from an outer edge part of the upper plate part. A gap is created between the cylindrical part and a side surface of the filter, and the cylindrical part covers an upper side surface part of the filter and allows a lower side surface part of the filter to be exposed.

Air bubbles mixed in the operating fluid generally rise in the operating fluid and are present near the oil level of the operating fluid. However, the abovementioned work vehicle is able to suppress the suction of air bubbles present near the oil level into the strainer since the upper surface of the filter is covered by the upper plate part, and the upper side surface part of the filter is covered by the cylindrical part. Further, a space between the filter and the cover member is filled with the operating fluid since the upper part of the filter is covered by the cover member having the upper plate part and the cylindrical part. Since the space between the filter and the cover member is filled with the operating fluid in this way, the filter is not exposed to the air layer existing above the oil level even if the operating fluid tank sways and the oil level fluctuates up and down. Consequently, the suction of air due to the up and down fluctuation of the oil level can be suppressed.

Since the filter and the cylindrical part in the abovementioned strainer share the upper plate part, the gap between the filter and the cylindrical part can easily be maintained uniformly by setting the upper plate part as a base. Consequently, the gap between the filter and the cylindrical part can be reduced, for example, by several millimeters, and as a result the outer diameter of the strainer can be reduced. Since an opening for inserting or removing the strainer from the tank body is formed in the tank body, the opening can be made smaller and the stiffness of the tank body can be improved. An increase in the size of the opening greatly affects the stiffness of the tank body since the front-back dimension of the tank body in the wheel loader is generally small and the opening is generally formed on the upper surface of the tank body. As a result, reducing the size of the opening as described above is very useful.

(2) The cylindrical part preferably covers only the upper side surface part of the filter. According to this configuration, suction resistance is reduced and the operating fluid can be sufficiently sucked at the lower side surface part of the filter since nothing is interposed between the lower side surface part of the filter and the operating fluid.

(3) The strainer preferably further includes a supporting member for supporting the bottom part of the filter, and the cover member further includes a plurality of pillar parts that extend downward from the cylindrical part. The pillar parts are disposed with gaps therebetween and the lower end parts thereof are supported by the supporting member. According to this configuration, the cover member is supported on the supporting member by the pillar parts thus improving durability. Since the pillar parts are disposed with gaps therebetween, the lower side surface part of the filter can be exposed between the pillar parts.

(4) The strainer may further include a supporting member for supporting a bottom part of the filter, and the cylindrical part may cover the entire side surface of the filter and may include a plurality of through-holes in a lower part. A lower end part of the cylindrical part is supported by the supporting member. According to this configuration, the durability of the cover member is improved since the lower end part of the cylindrical part is supported by the supporting member. The lower side surface part of the filter can be exposed via the through-holes since a plurality of through-holes are formed in the lower part of the cylindrical part.

(5) The cylindrical part preferably has an air escape hole in an upper end part. According to this configuration, air can escape from the air escape hole even if air enters the space between the cylindrical part and the filter.

(6) A hydraulic pump is preferably included for supplying the operating fluid inside the tank body to the work implement, and the tank body is located higher than the hydraulic pump. According to this configuration, since the hydraulic pump is located below the tank body, the operating fluid can be supplied from the tank body due to gravity so that the hydraulic pump is constantly immersed in the operating fluid even when the hydraulic pump is not operating. As a result, a variable piston pump, for example, can be used as a hydraulic pump that is necessarily immersed in the operating fluid even when the hydraulic pump is not operating.

(7) The length of the tank body in the front-back direction is preferably shorter than the length in the vehicle width direction. According to this configuration, even if the length of the tank body in the front-back direction is short, a capacity can be assured for collecting a sufficient amount of the operating fluid due to the length in the vehicle width direction. By reducing the length in the front-back direction, the up and down fluctuation of the oil level can be reduced even if the tank body sways in the front-back direction. As a result, the mixing of air bubbles in the operating fluid due to the rolling and agitation of the operating fluid can be suppressed.

(8) The tank body is preferably disposed in the approximate center in the vehicle width direction. When the length of the tank body in the vehicle width direction is increased for assuring capacity to collect a sufficient amount of the operating fluid, fluctuation of the oil level may easily increase due to the tank body swaying in the vehicle width direction. Accordingly, by disposing the tank body in the approximate center in the vehicle width direction, the swaying of the tank body in the vehicle width direction can be reduced and the up and down fluctuation of the oil level can be suppressed.

(9) The strainer is preferably replaced in an integrated manner with the filter and the cover member. According to this configuration, replacement work of the strainer can be performed more easily.

(10) The upper surface of the filter may be located above half the height of the internal space of the tank body. According to this configuration, the length of the filter in the vertical direction can be increased and a surface area for sucking the operating fluid can be increased. While the strainer more easily projects above the oil level due to this configuration, the suction of air can be suppressed since the abovementioned space between the cover member and the filter is filled with the operating fluid.

(11) The strainer may further include a supporting member and an internal cylinder member. The supporting member includes an annular first base part and a first cylinder part that extends upward from an inner circumference edge of the first base part. The internal cylinder member has a cylindrical shape and is formed with a plurality of through-holes in a side wall, and a lower end part thereof is engaged with the first cylinder part. The filter has a bellows-like shape and is disposed along the outer circumferential surface of the internal cylinder member. The upper plate part has a discoid shape, and includes an outer circumference edge part that is folded downward. At least a portion of an upper end part of the outer circumferential surface of the cylindrical part is fastened to the inner circumferential surface of the outer circumference edge part of the upper plate part. According to this configuration, the filter can be supported by the internal cylinder member.

According to the present invention, the suction of air (including air bubbles in the operating fluid) in the strainer can be suppressed.

DETAILED DESCRIPTION OF EMBODIMENTS

Figure 1:
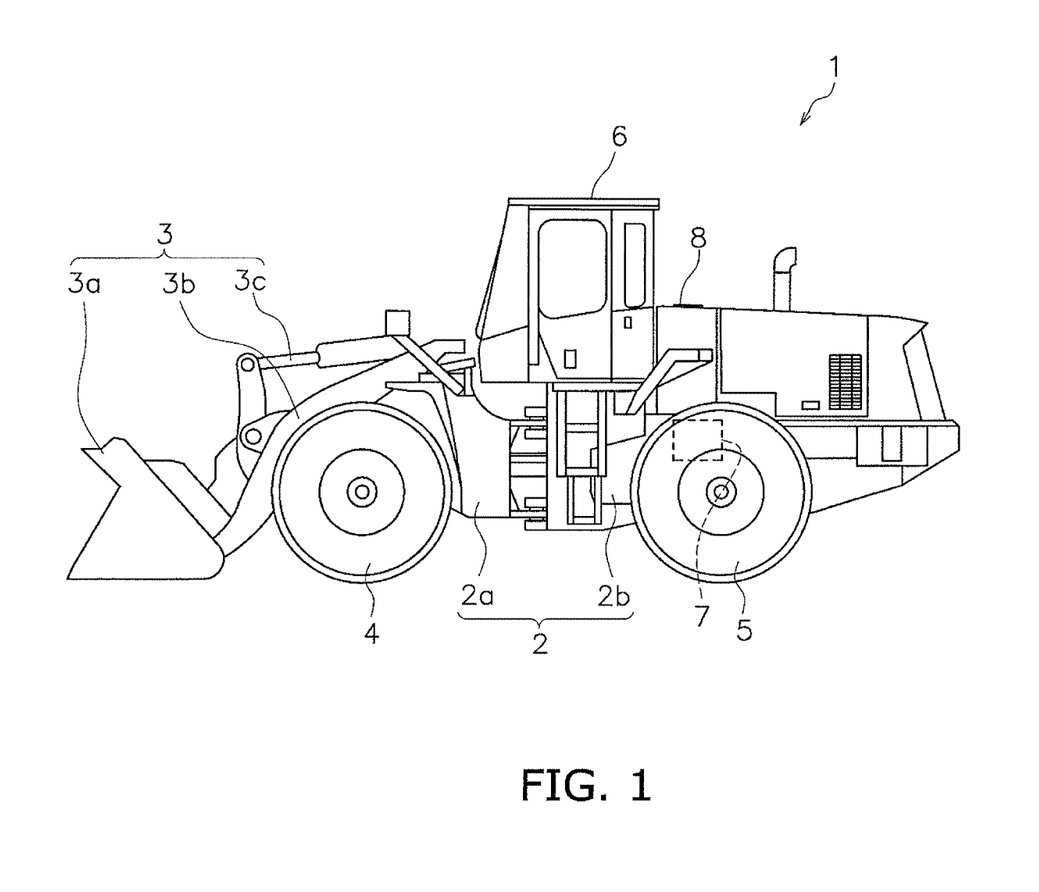
FIG. 1 is a side view of a wheel loader.

An embodiment of a wheel loader (example of a work vehicle) according to the present invention will be explained below with reference to the drawings. FIG. 1 is a side view of a wheel loader. In the following description, "right," "left," "up," and "down" indicate directions relative to a state of looking forward from the driver's seat, and "vehicle width direction" and "crosswise direction" have the same meaning.

As illustrated in FIG. 1, a wheel loader 1 includes a vehicle body frame 2, a work implement 3, front wheels 4, rear wheels 5, a cab 6, a plurality of hydraulic pumps 7, and an operating fluid tank 8. The wheel loader 1 is capable of traveling due to the rotation of the front wheels 4 and the rear wheels 5, and desired work can be conducted using the working equipment 3. The plurality of hydraulic pumps 7 include a work implement pump that discharges pressurized oil to the work implement 3, a steering pump that discharges pressurized oil to a steering system (not shown), and a torque converter pump that discharges pressurized oil to a torque converter (not shown). The work implement pump and the steering pump are variable piston pumps. The torque converter pump is a fixed capacity pump.

The vehicle frame 2 includes a front frame 2a and a rear frame 2b, and the front frame 2a and the rear frame 2b are coupled to each other to allow for swinging in the crosswise direction. The front frame 2a supports the work implement 3 and the front wheels 4, and the rear frame 2b supports the rear wheels 5, the cab 6, the hydraulic pumps 7 and the operating fluid tank 8.

The work implement 3 is a mechanism driven by operating fluid pressurized by the work implement pump. The work implement 3 is disposed at the front of the front frame 2a. The work implement 3 includes a bucket 3a, a boom 3b, lift cylinders (not shown), and a bucket cylinder 3c. The bucket 3a is attached to the tip of the boom 3b. The boom 3b is a member for raising the bucket 3a, and is mounted on the front part of the front frame 2a. The lift cylinders drive the boom 3*b* with pressurized oil discharged from the work implement pump. The bucket cylinder 3*c* drives the bucket 3*a* with pressurized oil discharged from the work implement pump.

An operating cabin is provided inside the cab 6, and various operating members and an operating panel are provided inside the cab 6. The operating fluid tank 8 is disposed to the rear of the cab 6, and the plurality of hydraulic pumps 7 are disposed below the operating fluid tank 8.

Figure 2:
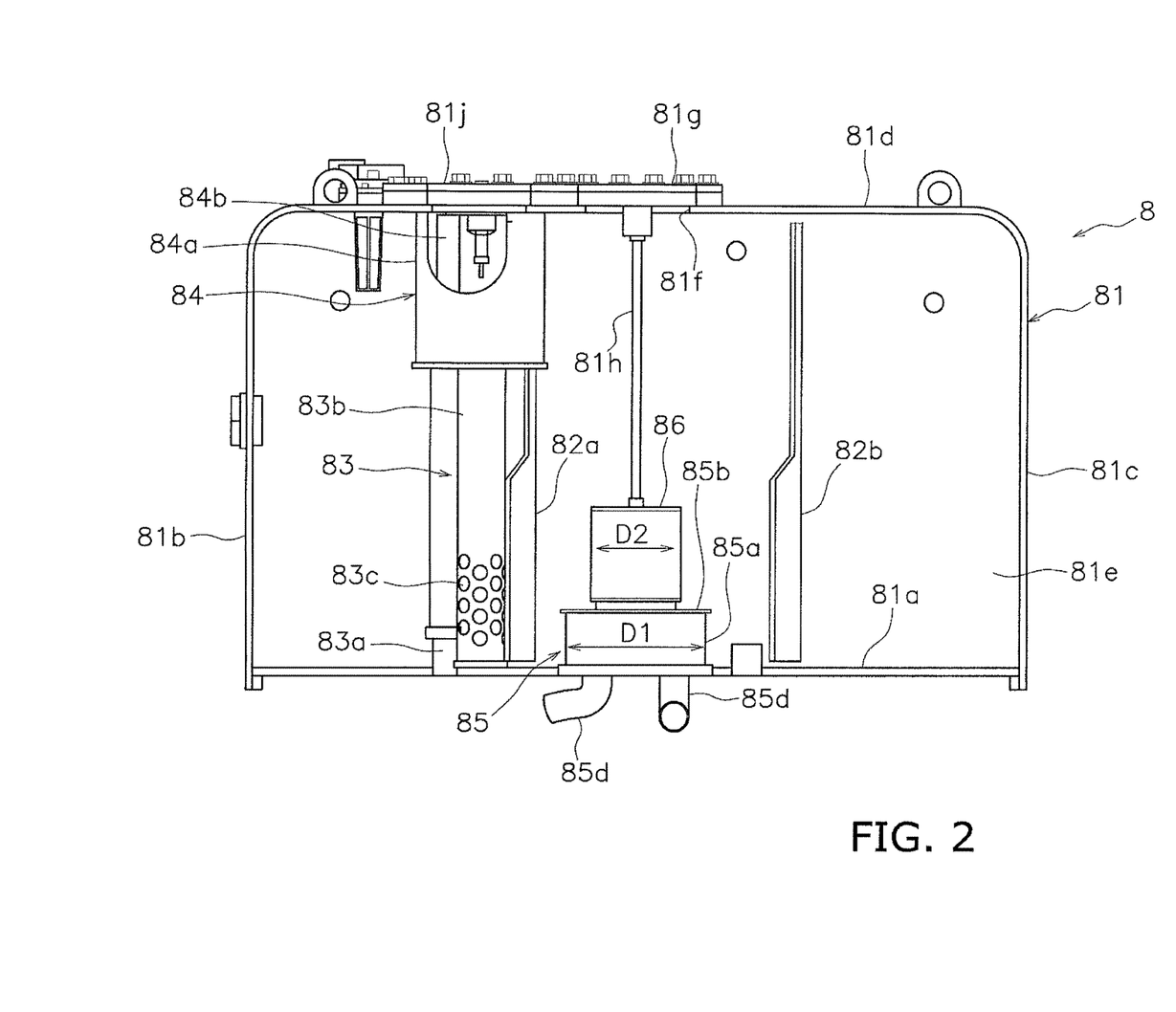
FIG. 2 is front cross-section view of an operating fluid tank.

FIG. 2 is a front cross-section view of an operating fluid tank as seen from the front. As illustrated in FIG. 2, the operating fluid tank 8 includes a tank body 81, first and second partition plates 82*a*, 82*b*, an operating fluid guide pipe 83, a filter member 84, an suction casing 85, and a strainer 86. The center axis of the operating fluid tank 8 in the vehicle width direction approximately matches the center axis of the wheel loader 1 in the vehicle width direction.

The tank body 81 is a box-like member formed by steel plates, and collects the operating fluid therein. An amount of operating fluid that at least allows the strainer 86 to be completely immersed is collected in the tank body 81, and an air layer is present above the oil level. Although not limited in particular, an amount of the operating fluid of about 60% of the capacity of the tank body 81 is generally collected inside the tank body 81. The tank body 81 includes a bottom plate 81*a*, side plates 81*b*, 81*c*, a top plate 81*d*, a front plate (not shown), and a rear plate 81*e*, and the length in the front-back direction is less than the length in the vehicle width direction.

The top plate 81*d* is formed with an opening part 81*f* for inserting and removing the strainer 86 when replacing the strainer 86, and the opening part 81*f* is sealed by a first lid member 81*g*. The opening part 81*f* has a discoid shape, and the inner diameter of the opening part 81*f* is larger than the outer diameter of the strainer 86 so that the strainer 86 can be inserted or removed.

The first lid member 81*g* has a discoid shape and is fixed to the top plate 81*d* in a removable manner by bolts and the like to seal the opening part 81*f*. The first lid member 81*g* includes a strainer rod 81*h* that extends downward from the bottom surface of the first lid member 81*g*. The strainer rod 81*h* is formed with a male screw at the bottom part and is connected in a removable manner to the strainer 86. As a result, the upper end part of the strainer 86 is supported by the strainer rod 81*h*. By removing the first lid member 81*g* from the top plate 81*d* and lifting the first lid member 81*g* upwards, the strainer 86 can be removed from the tank body 81. An old strainer 86 can be removed from the strainer rod 81*h* and replaced with a new strainer 86.

The first and second partition plates 82*a*, 82*b* are disposed substantially parallel to the side plates 81*b*, 81*c* of the tank body 81, and divide the inside of the tank body 81 into a plurality (three) of spaces in the vehicle width direction. The front edges of the first and second partition plates 82*a*, 82*b* are connected to the front plate of the tank body 81, and the rear edges are connected to the rear plate 81*e* of the tank body 81. The first partition plate 82*a* is disposed away from the second partition plate 82*b* in the vehicle width direction. The first and second partition plates 82*a*, 82*b* divide only the lower part of the inside of the tank body 81 and do not divide the upper part of the inside of the tank body 81. Specifically, the upper part of the space inside the tank body 81 enables fluid communication.

The operating fluid guide pipe 83 is provided inside the tank body 81, and is a pipe for allowing the passage of operating fluid that has returned to the inside of the tank body 81 from the work implement 3 and the like. The operating fluid guide pipe 83 includes a first pipe section 83*a* and a second pipe section 83*b*, and the first and second pipe sections 83*a*, 83*b* are coupled to each other via the filter member 84.

The first pipe section 83*a* supplies the operating fluid that has returned to the inside of the tank body 81 from the work implement 3 and the like, to the filter member 84. The first pipe section 83*a* extends in the vertical direction to the rear of the second pipe section 83*b*, and a lower end thereof is coupled to a return inlet formed in the bottom plate 81*a* of the tank body 81, and an upper end thereof is coupled to the filter member 84.

The upper end of the second pipe section 83*b* is coupled to the filter member 84, and the lower part of the second pipe section 83*b* is formed with a plurality of through-holes 83*c*. The second pipe section 83*b* discharges the operating fluid filtered by the filter member 84 into the tank body 81 via the through-holes 83*c*.

The filter member 84 is a member for filtering the operating fluid that has been returned to the tank body 81. The filter member 84 includes a filter casing 84*a* and an oil filter 84*b* provided inside the filter casing 84*a*.

The filter casing 84*a* has a cylindrical shape that is open at the top surface, and the upper end of the side wall is connected in a fluid-tight manner to the lower surface of the top plate 81*d* of the tank body 81. Specifically, the upper surface of the filter casing 84*a* is defined by the top plate 81*d*. The filter casing 84*a* enables fluid communication with the first pipe section 83*a* at the side wall, and with the second pipe section 83*b* at the bottom plate. An opening part that is partially located inside the filter casing 84*a* is formed in the top plate 81*d*. A second lid member 81*j* is fixed in a removable manner to the top plate 81*d* with bolts and the like so as to seal the opening part.

The oil filter 84*b* is a cylindrical member disposed inside the filter casing 84*a*, and filters the operating fluid supplied to the filter casing 84*a* from the first pipe section 83*a*. The operating fluid that passes through the oil filter 84*b* and filtered is supplied to the second pipe section 83*b*. The oil filter 84*b* is able to be removed via the opening part in the top plate 81*d* by removing the second lid member 81*j*.

The suction casing 85 has a cylindrical shape that opens at the bottom surface, and includes a side wall 85*a* and a top plate 85*b*. The lower end of the side wall 85*a* is coupled in a fluid-tight manner to the bottom plate 81*a* of the tank body 81, and the lower surface of the suction casing 85 is defined by the bottom plate 81*a*. The top plate 85*b* includes an opening part in the center, and fluid communication is enabled between the suction casing 85 and the strainer 86 through the opening part. The suction casing 85 includes a cylindrical insertion part 85*c* (see FIG. 3) that projects upward from the circumference edge of the opening part of the top plate 85*b*, and the insertion part 85*c* is inserted into the lower end part of the strainer 86.

A plurality of suction inlets (not shown) are formed in a portion of the bottom plate 81*a* located inside the suction casing 85, and suction pipes 85*d* that extend from the pumps 7 are coupled to any of the suction inlets. As a result, the operating fluid inside the suction casing 85 is sucked into the pumps 7 and supplied to actuators of the work implement 3 and the like. The inner diameter D1 of the suction casing 85 is larger than the inner diameter D2 of the strainer 86. The suction casing 85 is disposed in substantially the center in the front-back direction and in the vehicle width direction in the tank body 81.

Figure 3:
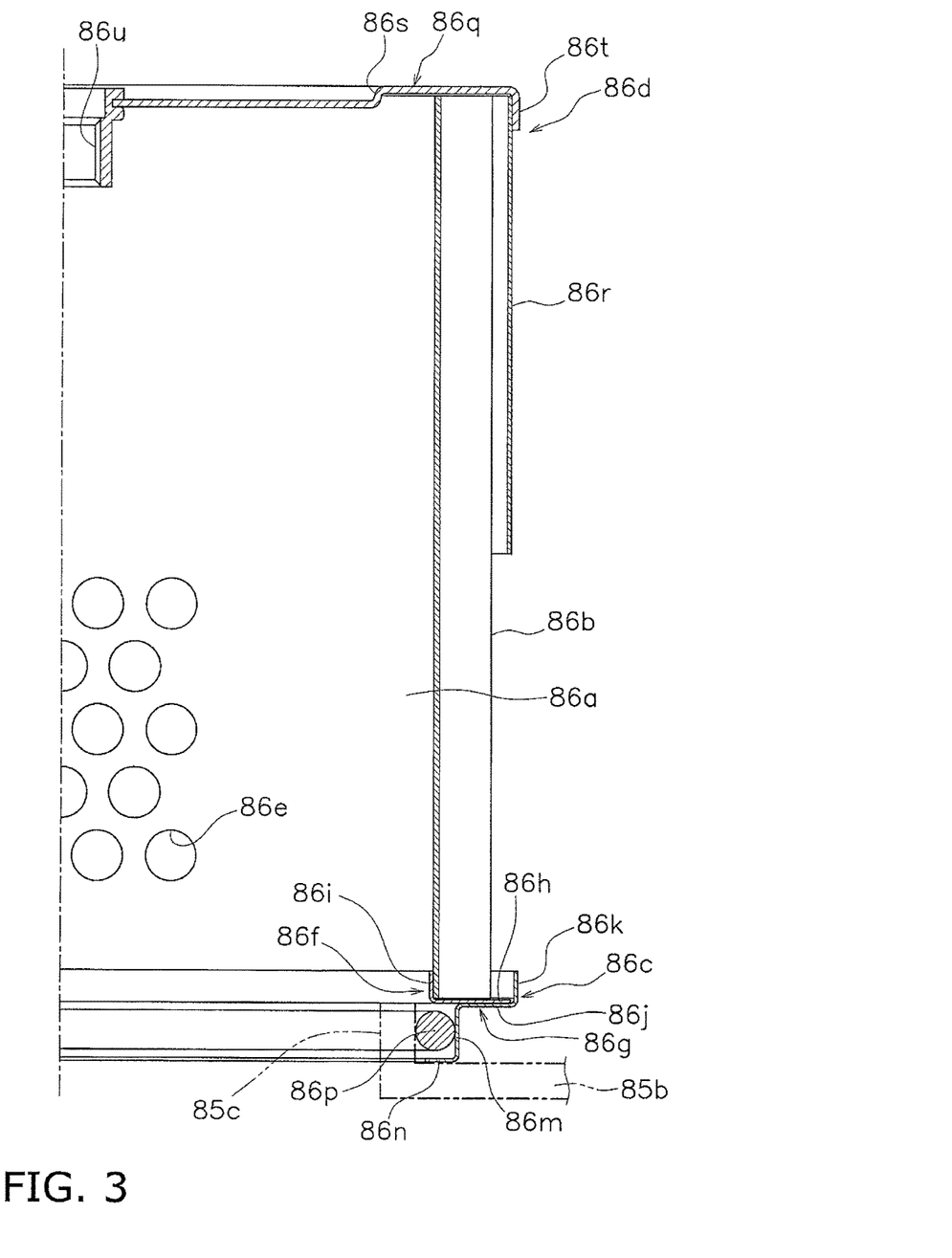
FIG. 3 is a front cross-section view of the right half of a strainer.
Figure 4:
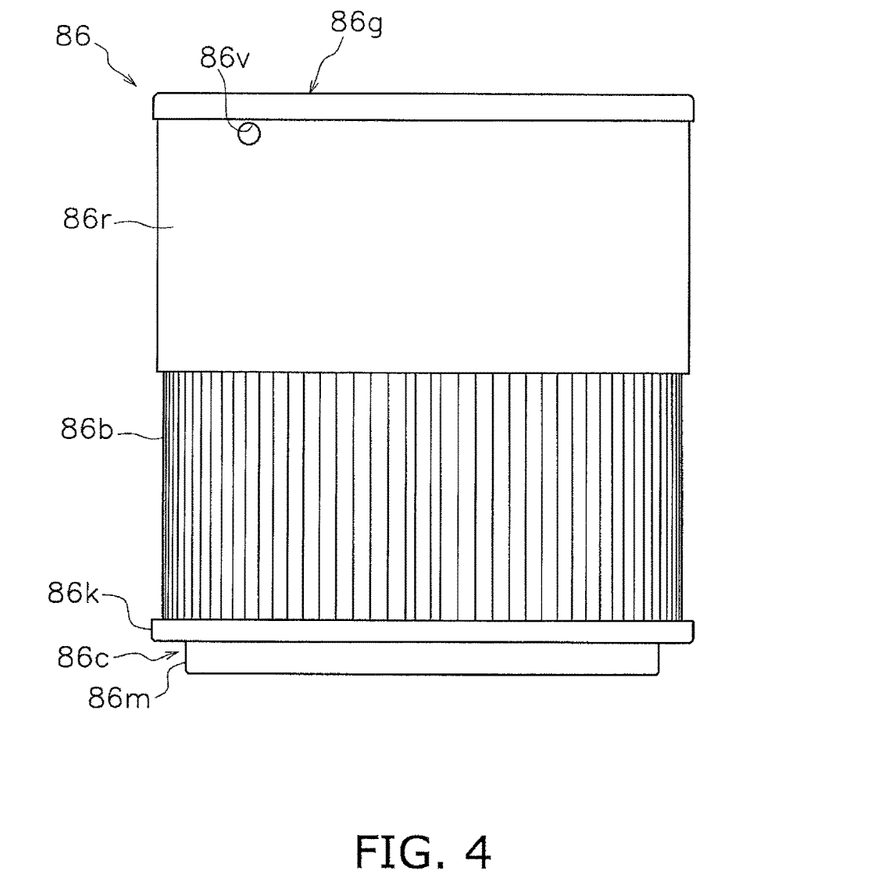
FIG. 4 is a front view of the strainer.

FIG. 3 is a front cross-section view of the strainer, and FIG. 4 is a front view of the strainer. Only the right half of the strainer is illustrated in FIG. 3 to facilitate explanation. As illustrated in FIGS. 3 and 4, the strainer 86 includes an internal cylinder member 86a, a filter 86b, a supporting member 86c, and a cover member 86d. The strainer 86 is disposed in substantially the center in the front-back direction and in the vehicle width direction in the tank body 81.

As illustrated in FIG. 3, the internal cylinder member 86a has a cylindrical shape that opens at the upper surface and the lower surface. The internal cylinder member 86a is formed with a plurality of through-holes 86e throughout. Only a portion of the through-holes are illustrated in FIG. 3 and other through-holes are omitted. The internal cylinder member 86a preferably has a large opening surface area due to the through-holes 86e, within a range that allows for the filter 86b to be stably supported, so that the operating fluid is able to flow smoothly from the outside to the inside of the internal cylinder member 86a.

As illustrated in FIGS. 3 and 4, the filter 86b has a substantially cylindrical shape that opens at the upper surface and the lower surface. The filter 86b is supported by the internal cylinder member 86a due to the inner circumferential surface of the filter 86b contacting the outer circumferential surface of the internal cylinder member 86a. As illustrated in FIG. 4, the filter 86b is formed in a bellows-like shape having a plurality of ridges that extend in the vertical direction. As a result, the filter 86b is able to have a large filtering surface area. The horizontal direction surface area of the ridges in the filter 86b has a triangular shape with an apex thereof located at the outer circumference side.

The supporting member 86c is a substantially annular member having an opening part in the center, and includes a first member 86f and a second member 86g. The first member 86f and the second member 86g represent one member, that is, function as the supporting member 86c due to the fastening by adhesion or welding of a belowmentioned first base part 86h and a second base part 86j.

The first member 86f includes the annular first base part 86h and a first cylinder part 86i. The first cylinder part 86i extends upward from the inner circumference edge of the first base part 86h. The first cylinder part 86i is engaged with the lower end of the internal cylinder member 86a in a state in which the inner circumferential surface of the internal cylinder member 86a contacts the outer circumferential surface of the first cylinder part 86i. The first member 86f supports the bottom part of the filter 86b due to the lower end the filter 86b being placed on the first base part 86h.

The second member 86g of the supporting member 86c includes the annular second base part 86j, a second cylinder part 86k, a third cylinder part 86m, and an annular collar part 86n. The second cylinder part 86k extends upward from the outer circumference edge of the second base part 86j. The third cylinder part 86m extends downward from the inner circumference edge of the second base part 86j. The collar part 86n extends toward the inside from the lower end of the third cylinder part 86m.

An O-ring 86p is disposed inside a space defined by the first base part 86h, the third cylinder part 86m, and the collar part 86n. The outer diameter of the O-ring 86p is substantially equal to the inner diameter of the third cylinder part 86m. An opening of the supporting member 86c is defined by the inner circumferential surface of the first cylinder part 86i and the inner circumference edge of the collar part 86n. When the insertion part 85c of the suction casing 85 is inserted into the opening part of the supporting member 86c, the O-ring 86p is compressed in the radial direction by the third cylinder part 86m and the insertion part 85c. Consequently, the suction casing 85 and the strainer 86 are coupled in a fluid-tight manner. The strainer 86 and the suction casing 85 are in fluid communication in the state in which the strainer 86 is coupled to the suction casing 85.

The cover member 86d includes an upper plate part 86q and a cylindrical part 86r. The upper plate part 86q has a discoid shape, and is fastened to the upper end of the filter 86b so as to cover the open upper surface of the filter 86b. Consequently, the upper plate part 86q covers the upper surface of the filter 86b. A stepped section 86s is formed in the upper plate part 86q and an outer circumference part located on the outer circumference side of the stepped section 86s is located higher than an inner circumference part located on the inner circumference side of the stepped section 86s.

The upper plate part 86q includes an outer circumference edge part (example of outer edge part) 86t that is bent downward, and a recessed part 86u formed in the center. A female screw is formed in the inner circumferential surface of the recessed part 86u. The strainer rod 81h is connected in a removable manner to the strainer 86 by the female screw of the recessed part 86u being engaged together with the male screw formed in the lower end part of the strainer rod 81h. By coupling the strainer 86 and the strainer rod 81h, vertical movement of the strainer 86 is restricted and the strainer 86 is prevented from coming off of the suction casing 85. While the recessed part 86u is formed as a member separate from other members of the upper plate part 86q, the recessed part 86u may be formed integrally with other parts of the upper plate part 86q.

The cylindrical part 86r is a cylindrical member that opens at the upper surface and the lower surface, and covers the upper side surface part of the filter 86b. The cylindrical part 86r does not extend to the lower side surface part of the filter 86b, and the lower side surface part of the filter 86b is exposed to the operating fluid inside the tank body 81.

The upper end part of the side surface of the cylindrical part 86r is fastened by, for example, spot welding or by an adhesive, to the inner circumferential surface of the outer circumference edge part 86t of the upper plate part 86q. As a result, the cylindrical part 86r is fixed to the upper plate part 86q. In view of the suction amount of the operating fluid, the length of the cylindrical part 86r in the vertical direction is preferably, but not limited to, no more than about 70% of the length of the filter 86b in the vertical direction, or more preferably no more than 50% when considering low temperatures. In view of preventing the suction of air, the length of the cylindrical part 86r in the vertical direction is preferably, but not limited to, no less than about 30% of the length of the filter 86b in the vertical direction.

A gap is opened between the cylindrical part 86r and a position of the outermost circumference of the filter 86b (the apex of the ridges). The gap is preferably, but not limited to, between about 2 mm and about 5 mm (inclusive). In a state in which the operating fluid collects inside the tank body 81, the operating fluid fills the space between the cylindrical part 86r and the filter 86b. An air escape hole 86v is formed in the upper end part of the cylindrical part 86r in order to discharge air bubbles that enter the space between the cylindrical part 86r and the filter 86b to the outside.

As described above, when replacing the strainer 86, the strainer 86 is replaced in an integrated manner with the filter 86b and the cover member 86d since the filter 86b is fixed to the cover member 86d. According to this configuration, replacement work of the strainer 86 can be performed more easily.

Characteristics

The wheel loader according to the present embodiment has the following characteristics.

(1) The suction of air bubble present near the oil level in the strainer 86 can be suppressed since the upper surface of the filter 86b is covered by the upper plate part 86q and the upper side surface part of the filter 86b is covered by the cylindrical part 86r. The operating fluid fills the space between the filter 86b and the cover member 86d since the upper part of the filter 86b is covered by the cover member 86d that includes the upper plate part 86q and the cylindrical part 86r. Since the space between the filter 86b and the cover member 86d is filled by the operating fluid in this way, the filter 86b is not exposed to the air layer that is present above the oil level even if the tank body 81 sways and the oil level fluctuates up and down. Consequently, the suction of air due to the up and down fluctuation of the oil level can be suppressed.

(2) Suction resistance is reduced and the operating fluid can be sufficiently sucked from the lower side surface part of the filter 86b since nothing is interposed between the lower side surface part of the filter 86b and the operating fluid.

(3) Air can escape from the air escape hole 86v even if air enters the space between the cylindrical part 86r and the filter 86b.

(4) Since the various types of hydraulic pumps 7 are located below the tank body 81, the operating fluid can be supplied from the tank body 81 due to gravity so that the various types of hydraulic pumps are constantly immersed in the operating fluid even when the hydraulic pumps are not operating. As a result, a variable piston pump, for example, can be used as a hydraulic pump that is necessarily immersed in the operating fluid even when not operating.

(5) Even if the length of the tank body 81 in the front-back direction is short, a capacity can be assured for collecting a sufficient amount of the operating fluid due to the length in the vehicle width direction. By reducing the length in the front-back direction, the up and down fluctuation of the oil level can be reduced even if the tank body 81 sways in the front-back direction. As a result, the mixing of air bubbles in the operating fluid due to the rolling and agitation of the operating fluid can be suppressed.

(6) Since the length of the tank body in the vehicle width direction is increased for assuring capacity to collect a sufficient amount of the operating fluid, fluctuation of the oil level may easily increase due to the tank body 81 swaying in the vehicle width direction. Accordingly, by disposing the tank body 81 in the approximate center in the vehicle width direction in the above embodiment, the swaying of the tank body 81 in the vehicle width direction is reduced and the up and down fluctuation of the oil level can be suppressed.

MODIFIED EXAMPLES

While an embodiment of the present invention has been described above, the present invention is not limited to the embodiment and many variations and modifications can be made within the spirit of the present invention.

Modified Example 1

Figure 5:
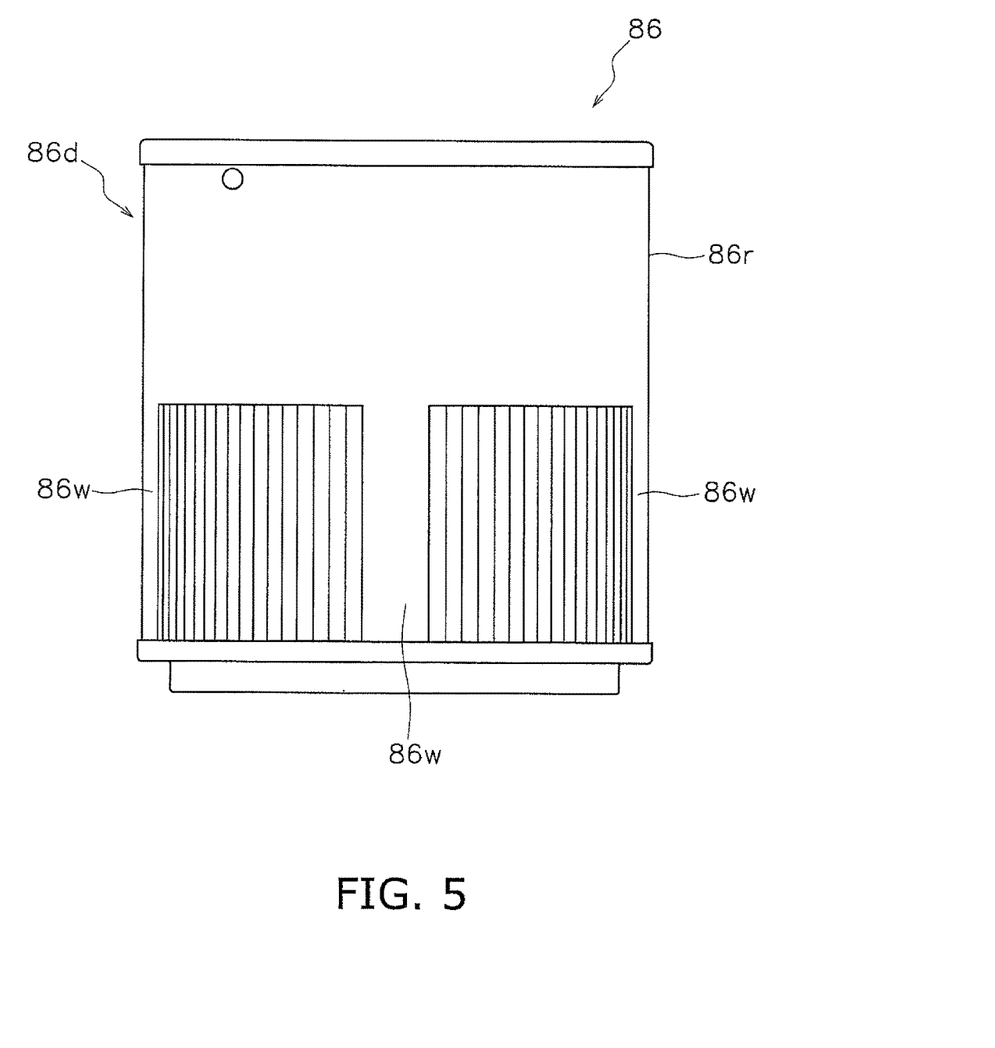
FIG. 5 is a front view of the strainer according to a first modified example.
Figure 6:
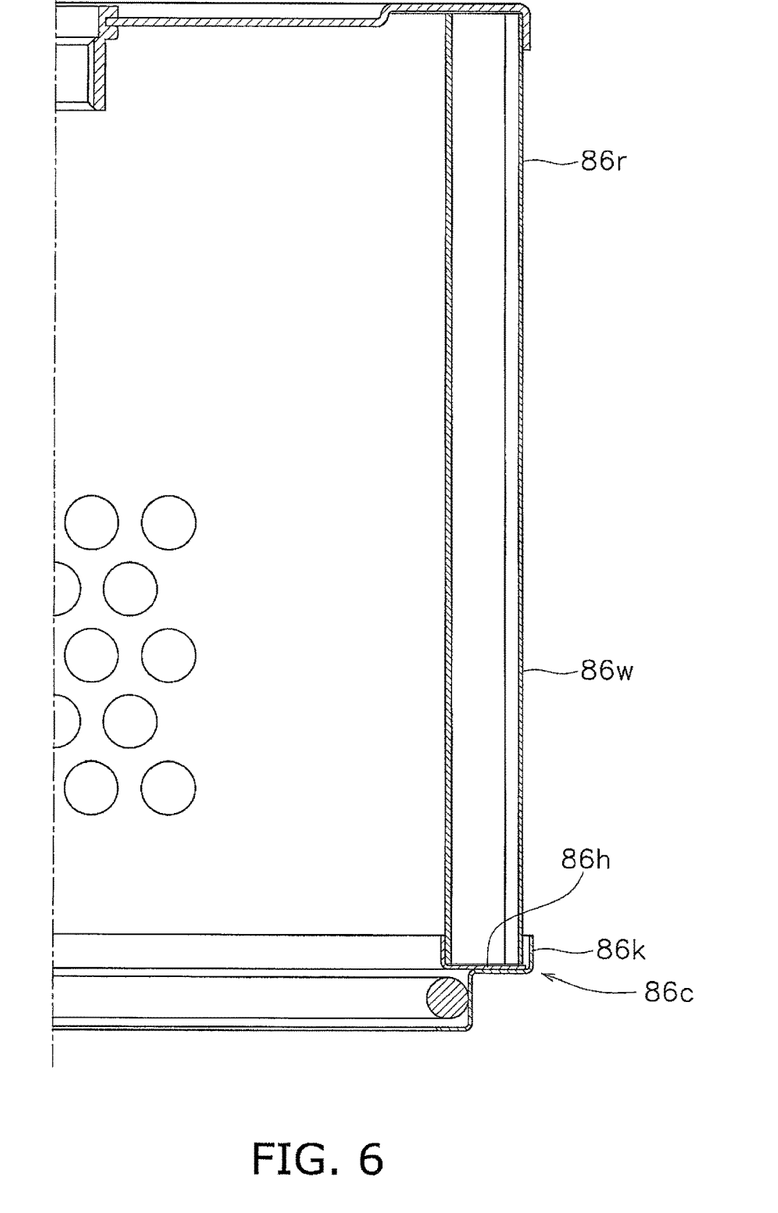
FIG. 6 is a front cross-section view of the right half of the strainer according to a first modified example.

FIG. 5 is a front view of a strainer according to a first modified example, and FIG. 6 is a front cross-section view of the right half of the strainer according to the first modified example. As illustrated in FIG. 5, the cover member 86d of the strainer 86 according to the first modified example may further include a plurality of pillar parts 86w that extend downward from the cylindrical part 86r. As illustrated in FIG. 6, each of the pillar parts 86w is supported by the supporting member 86c due to the lower end of the pillar parts 86w being placed on the first base part 86h of the supporting member 86c. The outer circumferential surface of the lower end of each of the pillar parts 86w may be configured to contact the inner circumferential surface of the second cylinder part 86k of the supporting member 86c. As a result, the lower end of the pillar parts 86w is supported in a stable manner by the supporting member 86c. The lower end of the pillar parts 86w may be fastened to the supporting member 86c by spot welding or by an adhesive and the like. The pillar parts 86w in the first modified example may be formed integrally with the cylindrical part 86r, or may be members separate from the cylindrical part 86r.

According to the first modified example, durability is improved since the cover member 86d is supported on the supporting member 86c by the pillar parts 86w. Since the pillar parts 86w are disposed with intervals therebetween, the lower side surface part of the filter 86b can be exposed between the pillar parts 86w.

Modified Example 2

Figure 7:
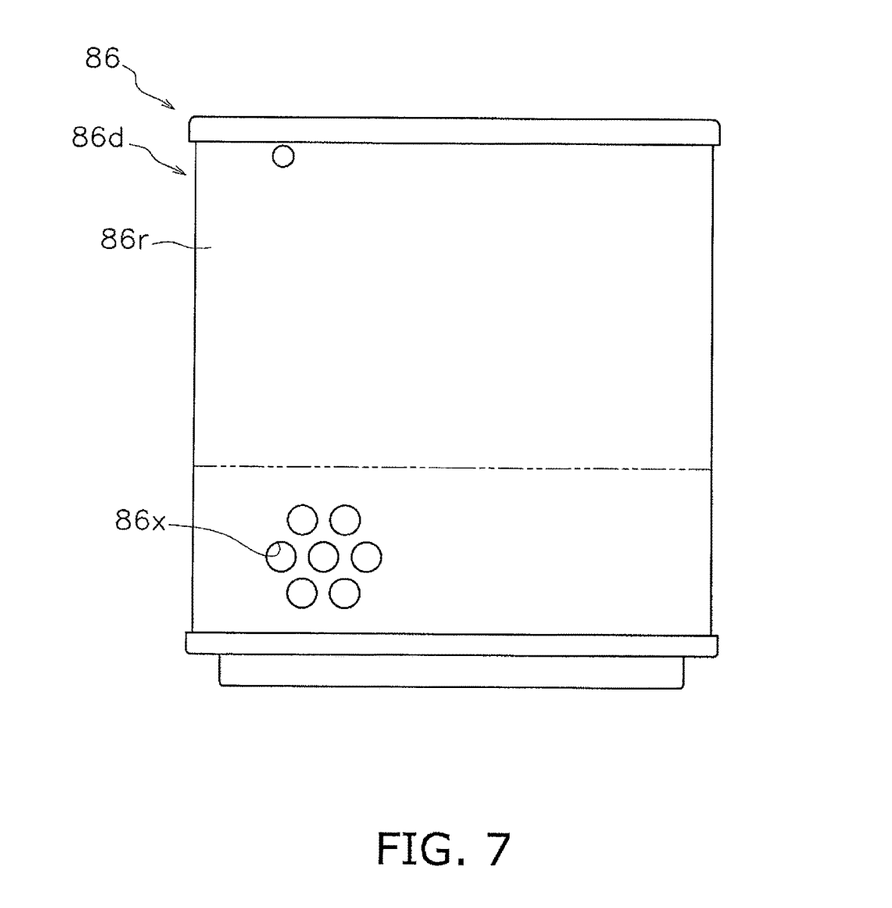
FIG. 7 is a front view of the strainer according to a second modified example.

FIG. 7 is a front view of the strainer according to a second modified example. As illustrated in FIG. 7, the cylindrical part 86r of the cover member 86d according to the second modified example covers the entire side surface of the filter 86b. A plurality of through-holes 86x are formed over the entire bottom part of the cylindrical part 86r in order to expose the lower side surface part of the filter 86b to the operating fluid inside the tank body 81. Only a portion of the through-holes 86x are illustrated in FIG. 7 and other through-holes are omitted. The bottom region in which the through-holes 86x are formed in the cylindrical part 86r is preferably, but not limited to, between about 30% and about 70% (inclusive), or more preferably between about 50% and about 70%(inclusive), of the length of the cylindrical part 86r in the vertical direction.

Figure 8:
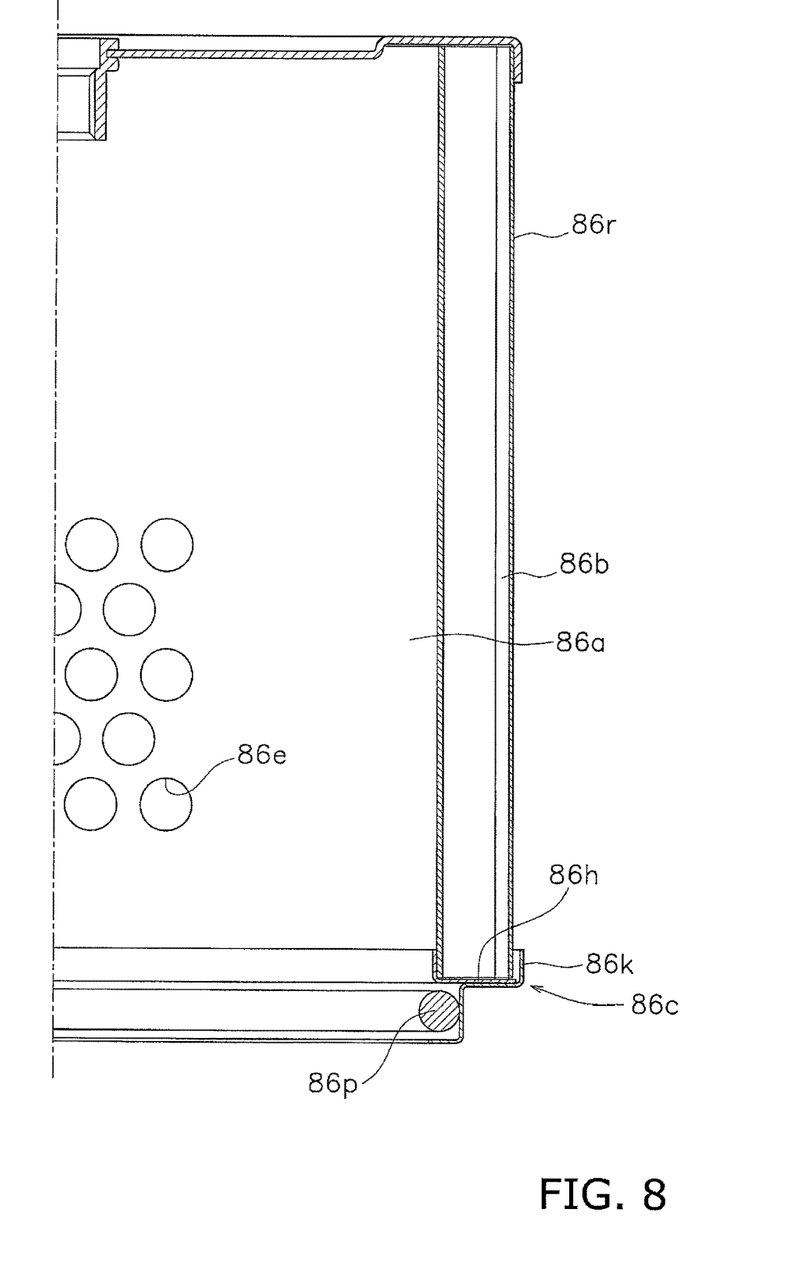
FIG. 8 is a front cross-section view of the right half of the strainer according to the second modified example.

FIG. 8 is a front cross-section view of the right half of the strainer according to the second modified example. As illustrated in FIG. 8, the lower end part of the cylindrical part 86r is supported by the supporting member 86c due to the lower end part of the cylindrical part 86r being placed on the first base part 86h of the supporting member 86c. The outer circumferential surface of the lower end part of the cylindrical part 86r may be configured to contact the inner circumferential surface of the second cylinder part 86k of the supporting member 86c. As a result, the lower end part of the cylindrical part 86r is supported in a more stable manner by the supporting member 86c. The lower end of the cylindrical part 86r may be fastened to the supporting member 86c by spot welding or by an adhesive and the like.

According to this configuration, durability of the cover member 86d is improved since the lower end part of the cylindrical part 86r is supported by the supporting member 86c. Since the cylindrical part 86r is formed with a plurality of through-holes 86x in the lower part, the lower side surface part of the filter 86b can be exposed via the through-holes 86x.

Modified Example 3

Figure 9:
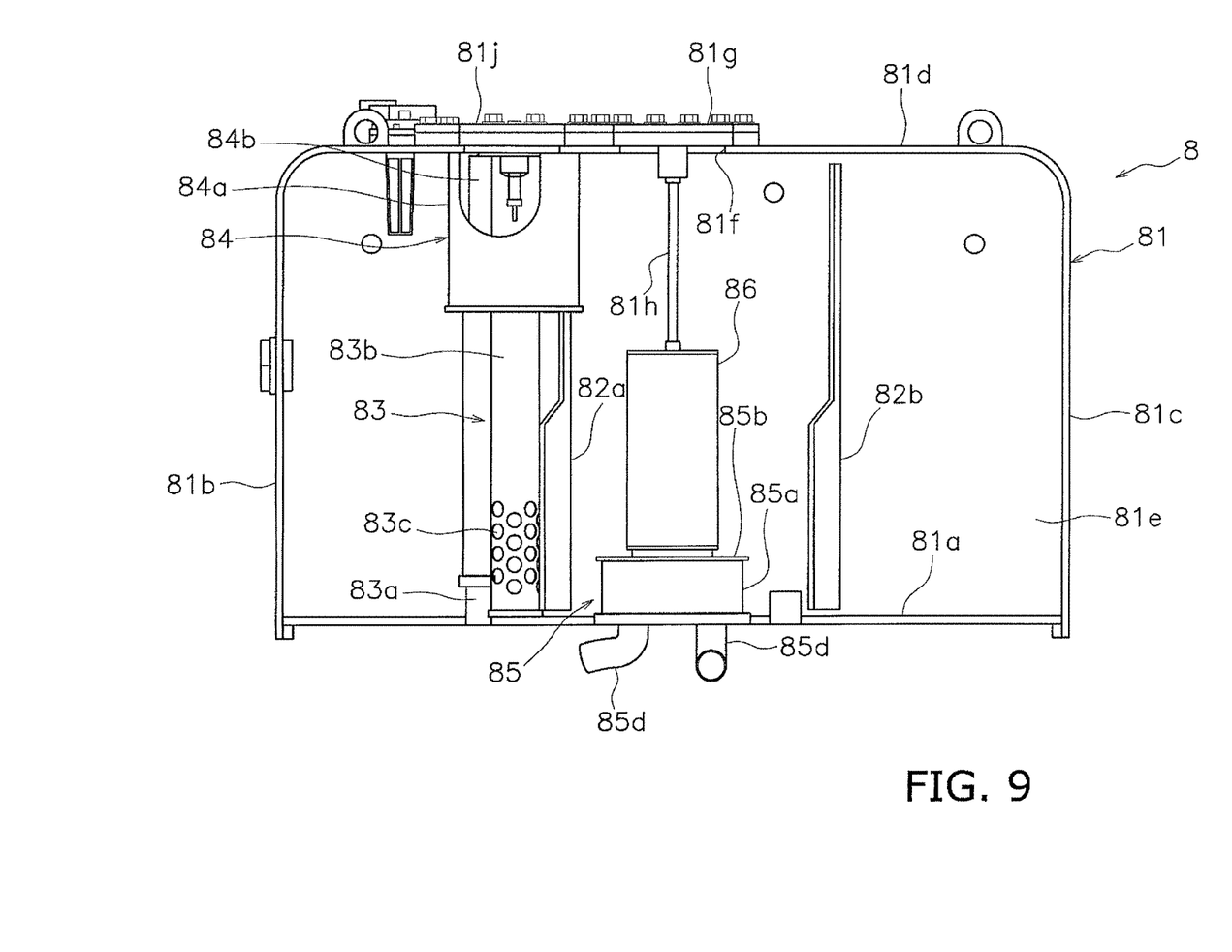
FIG. 9 a front cross-section view of the right half of the operating fluid tank according to a third modified example.

FIG. 9 is a front cross-section view of an operating fluid tank according to a third modified example. As illustrated in FIG. 9, the upper surface of the strainer 86 and in particular the upper surface of the filter 86*b* are higher than half the height of the internal space of the tank body 81. According to this configuration, the length of the filter 86*b* in the vertical direction can be increased and a surface area for sucking the operating fluid can be increased. While the strainer 86 projects easily above the oil level due to such a configuration, the suction of air can be suppressed since the space between the cover member 86*d* and the filter 86*b* is filled with the operating fluid as described above.

Modified Example 4

The structure in which the internal cylinder member 86*a* can be supported from the inside of the filter 86*b* is not limited to the structure of the abovementioned embodiment. For example, the internal cylinder member 86*a* can be configured by a plurality of ring-like members disposed in intervals in the vertical direction. In this case, the ring-like members are preferably disposed so as to support the upper end and the lower end of the filter 86*b*. The internal cylinder member 86*a* preferably includes coupling parts that extend in the vertical direction to be coupled to the ring-like members.

Modified Example 5

While the operating fluid tank 8 is placed higher than the various types of hydraulic pumps 7 in the above embodiment, the operating fluid tank 8 may be disposed, without being limited to, lower than the various hydraulic pumps 7. For example, the operating fluid tank 8 can be disposed below the cab 6.

Modified Example 6

While the upper plate part 86*q* of the cover member 86*d* in the above embodiment is fastened to the filter 86*b* so as to define the open upper surface of the filter 86*b*, the present invention is not limited as such. For example, a gap may be opened and the upper plate part 86*q* may be disposed above the filter 86*b*. In this case, the space between the filter 86*b* and the upper plate part 86*q* is filled with the operating fluid.

Modified Example 7

The filter 86*b* may not be open at the upper surface. In this case, by providing a gap between the upper plate part 86*q* and the filter 86*b* as described above in modified example 6, the filter 86*b* is able to filter the operating fluid at the upper surface.

Modified Example 8

While the filter 86*b* is supported on the internal cylinder member 86*a* due to the inner circumferential surface of the filter 86*b* contacting the outer circumferential surface of the internal cylinder member 86*a* in the above embodiment, the present invention is not limited as such. For example, the filter 86*b* may be supported by the internal cylinder member 86*a* due to at least a portion of the inner circumferential surface of the filter 86*b* being fastened to the outer circumferential surface of the internal cylinder member 86*a* by an adhesive and the like.

Modified Example 9

The present invention raises an example applied to a wheel loader in the above embodiment. However, the present invention is not limited to this example. For example, the present invention may be applied in the same way to another work vehicle such as a hydraulic excavator or a bulldozer and the like.

What is claimed is:

1. A work vehicle comprising:
   a work implement; and
   an operating fluid tank having a tank body configured to collect operating fluid for driving the work implement, and a strainer installed inside the tank body,
   the strainer including
      a cylindrical filter with an axis extending in a vertical direction; and
      a cover member including an upper plate part that covers an upper surface of the filter, and a cylindrical part that extends downward from an outer edge part of the upper plate part and covers an upper side surface part of the filter with a gap between the side surface of the filter and the cylindrical part while allowing a lower side surface part of the filter to be exposed, the cylindrical part having an air escape hole in an upper end part.

2. The work vehicle according to claim 1, wherein the cylindrical part covers only the upper side surface part of the filter.

3. The work vehicle according to claim 2, wherein the strainer further includes a supporting member for supporting a bottom part of the filter,
   the cover member further includes a plurality of pillar parts that extend downward from the cylindrical part,
   the pillar parts being disposed with gaps therebetween, and a lower end part of each pillar part being supported by the supporting member.

4. The work vehicle according to claim 1, wherein the strainer further includes a supporting member supporting the bottom part of the filter,
   the cylindrical part covers the entire side surface of the filter and includes a plurality of through-holes in a lower part, and
   a lower end part of the cylindrical part is supported by the supporting member.

5. The work vehicle according to claim 1, further comprising:
   a hydraulic pump configured to supply the operating fluid inside the tank body to the work implement, wherein the tank body is located higher than the hydraulic pump.

6. The work vehicle according to claim 1, wherein a length of the tank body in a front-back direction is shorter than a length of the tank body in a vehicle width direction.

7. The work vehicle according to claim 6, wherein the tank body is disposed in an approximate center in the vehicle width direction.

8. The work vehicle according to claim 1, wherein the strainer is replaced in an integrated manner with the filter and the cover member.

9. The work vehicle according to claim 1, wherein the upper surface of the filter is located higher than half a height of an internal space of the tank body.

10. The work vehicle according to claim 1, wherein the strainer includes:
    a supporting member having an annular first base part and a first cylinder part that extends upward from an inner circumference edge of the first base part; and
    an internal cylinder member having a cylindrical shape and being formed with a plurality of through-holes in a side wall, and a lower end part thereof being engaged with the first cylinder part, the filter having a bellows shape and being disposed along an outer circumferential surface of the internal cylinder member, the upper plate part having discoid shape, and including an outer circumference edge part that is folded downward, at least a portion of an upper end part of an outer circumferential surface of the cylindrical part being fastened to an inner circumferential surface of the outer circumference edge part of the upper plate part.

11. The work vehicle according to claim 1, wherein a lower end of the gap is open to allow operating fluid to enter the gap.

12. The work vehicle according to claim 1, wherein a lower end of the gap is exposed to an interior of the tank body.

* * * * *